US012252577B2

(12) United States Patent
Yamasugi et al.

(10) Patent No.: US 12,252,577 B2
(45) Date of Patent: Mar. 18, 2025

(54) CHLORINATED VINYL CHLORIDE RESIN

(71) Applicant: SEKISUI CHEMICAL CO., LTD., Osaka (JP)

(72) Inventors: Ryota Yamasugi, Yamaguchi (JP); Mitsuo Matsumoto, Yamaguchi (JP); Nami Nakajima, Osaka (JP); Yasunari Kusaka, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 420 days.

(21) Appl. No.: 17/911,835

(22) PCT Filed: Mar. 30, 2021

(86) PCT No.: PCT/JP2021/013704
§ 371 (c)(1),
(2) Date: Sep. 15, 2022

(87) PCT Pub. No.: WO2021/201042
PCT Pub. Date: Oct. 7, 2021

(65) Prior Publication Data
US 2023/0148238 A1 May 11, 2023

(30) Foreign Application Priority Data
Mar. 31, 2020 (JP) .................. 2020-064538

(51) Int. Cl.
*C08F 8/22* (2006.01)
*C08F 114/06* (2006.01)

(52) U.S. Cl.
CPC ............. *C08F 8/22* (2013.01); *C08F 114/06* (2013.01)

(58) Field of Classification Search
CPC .................. C08F 8/22; C08F 14/06
See application file for complete search history.

(56) References Cited

U.S. PATENT DOCUMENTS

| 2010/0063247 A1* | 3/2010 | Sanni | C08F 214/06 |
| | | | 528/392 |
| 2016/0200893 A1* | 7/2016 | Matsumura | C08K 3/26 |
| | | | 524/310 |
| 2016/0208072 A1 | 7/2016 | Matsumura et al. |
| 2017/0008981 A1 | 1/2017 | Matsumura et al. |
| 2022/0145061 A1* | 5/2022 | Matsumura | C08L 27/24 |
| 2022/0153983 A1 | 5/2022 | Matsumura et al. |

FOREIGN PATENT DOCUMENTS

| CN | 101451009 | 6/2009 |
| CN | 101541841 | 9/2009 |
| CN | 105555859 | 5/2016 |
| CN | 105579523 | 5/2016 |
| CN | 106103501 | 11/2016 |
| JP | 02-296854 | 12/1990 |
| JP | 08-311286 | 11/1996 |
| JP | 2000-352483 | 12/2000 |
| JP | 2015-013952 | 1/2015 |
| TW | 200823241 | 6/2008 |
| WO | 2020/203835 | 10/2020 |
| WO | 2020/203858 | 10/2020 |

OTHER PUBLICATIONS

International Search Report issued Jun. 15, 2021 in International PCT Application No. PCT/JP2021/013704 with English translation.

* cited by examiner

Primary Examiner — Robert C Boyle
(74) Attorney, Agent, or Firm — Wenderoth, Lind & Ponack, L.L.P.

(57) ABSTRACT

The present invention provides a chlorinated polyvinyl chloride resin that enables the production of a molded article that maintains high adhesion strength even when used in a form subjected to high pressure and is less susceptible to defects such as cracks due to insufficient strength, as well as a resin composition for molding and a molded article each including the chlorinated polyvinyl chloride resin. Provided is a chlorinated polyvinyl chloride resin, containing two components including a $A_{30}$ component and a $B_{30}$ component, the $A_{30}$ component and the $B_{30}$ component being determined by measuring the resin by a solid echo method using pulse NMR at 30° C. to give a free induction decay curve of $^1H$ spin-spin relaxation, and subjecting the free induction decay curve to waveform separation into two curves derived from the $A_{30}$ component and the $B_{30}$ component in order of shorter relaxation time using the least square method, and having a ratio of $T5_B$ to $T_B$ [$T5_B/T_B$] of 76% or more and less than 96%, where $T_B$ is a relaxation time of the $B_{30}$ component and $T5_B$ is a relaxation time of the $B_{30}$ component after heating at 200° C. for five minutes.

4 Claims, No Drawings

CHLORINATED VINYL CHLORIDE RESIN

TECHNICAL FIELD

The present invention relates to a chlorinated polyvinyl chloride resin that enables the production of a molded article that maintains high adhesion strength even when used in a form subjected to high pressure and is less susceptible to defects such as cracks due to insufficient strength, as well as a resin composition for molding and a molded article each including the chlorinated polyvinyl chloride resin.

BACKGROUND ART

Polyvinyl chloride resins generally have excellent mechanical strength, weather resistance, and chemical resistance, and thus have been processed into various molded articles and used in various fields.

Polyvinyl chloride resins, however, have poor heat resistance. This has led to the development of chlorinated polyvinyl chloride resins (CPVCs), which are polyvinyl chloride resins chlorinated to have improved heat resistance.

For example, Patent Literature 1 discloses a composition containing post-chlorinated polyvinyl chloride in combination with a specific stabilizer. Patent Literature 1 discloses that such a resin can withstand thermal stress and mechanical stress during processing.

CITATION LIST

Patent Literature

Patent Literature 1: JP H8-311286 A

SUMMARY OF INVENTION

Technical Problem

However, a molded article (e.g., a pipe or a joint) obtained using the chlorinated polyvinyl chloride resin disclosed in Patent Literature 1 may not have sufficient adhesion strength especially when used in a form subjected to high pressure, and may be disconnected or cause water leakage.

Moreover, the obtained molded article may have low fusion strength at a spider portion when used as a pipe, or may have low fusion strength at a weld portion when used as a joint. Such a molded article thus may crack when used as a joint or the like.

In view of the above issues in the prior art, the present invention aims to provide a chlorinated polyvinyl chloride resin that enables the production of a molded article that maintains high adhesion strength even when used in a form subjected to high pressure and is less susceptible to defects such as cracks due to insufficient strength, as well as a resin composition for molding and a molded article each including the chlorinated polyvinyl chloride resin.

Solution to Problem

The present invention provides a chlorinated polyvinyl chloride resin, containing two components including a $A_{30}$ component and a $B_{30}$ component, the $A_{30}$ component and the $B_{30}$ component being determined by measuring the resin by a solid echo method using pulse NMR at 30° C. to give a free induction decay curve of $^1H$ spin-spin relaxation, and subjecting the free induction decay curve to waveform separation into two curves derived from the $A_{30}$ component and the $B_{30}$ component in order of shorter relaxation time using the least square method, and having a ratio of $T5_B$ to $T_B$ [$T5_B/T_B$] of 76% or more and less than 96%, where $T_B$ is a relaxation time of the $B_{30}$ component and $T5_B$ is a relaxation time of the $B_{30}$ component after heating at 200° C. for five minutes.

The present invention is described in detail below.

The chlorinated polyvinyl chloride resin that is an embodiment of the present invention has a ratio of $T5_B$ to $T_B$ [$T5_B/T_B$] of 76% or more and less than 96%, where $T_B$ is a relaxation time of the $B_{30}$ component obtained by measuring the resin by a solid echo method using pulse NMR at 30° C. and $T5_B$ is a relaxation time of the $B_{30}$ component after heating at 200° C. for five minutes.

When the ratio [$T5_B/T_B$] of the relaxation time $T5_B$ of the $B_{30}$ component after heating at 200° C. for five minutes to the relaxation time $T_B$ is 76% or more and less than 96%, it is possible to produce a molded article that maintains high adhesion strength even when used in a form subjected to high pressure and that is less susceptible to defects such as cracks due to insufficient strength. The $T5_B/T_B$ is preferably 78% or more and 95% or less. The $T5_B/T_B$ is more preferably 80% or more and 94% or less, still more preferably 81% or more and 92% or less.

The ratio of the relaxation time $T5_B$ of the $B_{30}$ component after heating at 200° C. for five minutes to the relaxation time $T_B$ of the $B_{30}$ component refers to $T5_B/T_B$ expressed in percentage.

Herein, pulse NMR refers to an analysis involving detecting a response signal to a pulse to obtain a $^1H$ nuclear magnetic relaxation time of a sample. A free induction decay curve may be obtained as a pulse response. The free induction decay curve consists of overlapped multiple free induction decay curves derived from multiple components having different relaxation times. The relaxation times or the components thereof of the components having different relaxation times can be identified by waveform separation of the curve using the least square method. Analysis involving separation into three components using pulse NMR described above is a known technique. Examples of literatures describing the technique include JP 2018-2983 A.

The pulse NMR identifies two components, a $A_{30}$ component and a $B_{30}$ component. The $A_{30}$ component is a component having a short relaxation time in pulse NMR measurement and refers to a hard component with low molecular mobility. The $B_{30}$ component is a component having a long relaxation time in pulse NMR measurement and refers to a soft component with high molecular mobility.

The relaxation time $T_B$ of the $B_{30}$ component is preferably 0.140 ms or longer and 0.180 ms or shorter. When the relaxation time $T_B$ is within the above range, the surface of the molded article can have better solvent-swellability when a polyvinyl chloride adhesive is used, thus improving adhesion strength. Moreover, melting under heat starts earlier, which can improve fusion strength in a mold that has a portion where flows of molten resin join together during molding.

The lower limit of the relaxation time $T_B$ is more preferably 0.150 ms, and the upper limit thereof is more preferably 0.170 ms.

The relaxation time $T_B$ means a relaxation time measured without heating the chlorinated polyvinyl chloride resin.

In the present invention, the relaxation time $T5_B$ of the $B_{30}$ component after heating at 200° C. for five minutes is preferably 0.110 ms or longer and 0.150 ms or shorter. When the relaxation time $T5_B$ is within the above range, the surface of the molded article can have better solvent-swellability when a polyvinyl chloride adhesive is used, thus improving adhesion strength. Moreover, melting under heat starts earlier, which can improve fusion strength in a mold that has a portion where flows of molten resin join together during molding.

The lower limit of the relaxation time $T5_B$ is more preferably 0.115 ms, and the upper limit thereof is more preferably 0.145 ms.

The relaxation time $T5_B$ means a relaxation time after heating the chlorinated polyvinyl chloride resin at 200° C. for five minutes.

In the present invention, a ratio of $T5_B$ to $T20_B$ [$T5_B$/$T20_B$] is preferably 76% or more and less than 96%, where $T5_B$ is the relaxation time of the $B_{30}$ component after heating at 200° C. for 5 minutes and $T20_B$ is a relaxation time of the $B_{30}$ component after heating at 200° C. for 20 minutes. When the ratio is within the above range, the surface of the molded article can have better solvent-swellability when a polyvinyl chloride adhesive is used, thus improving adhesion strength. Moreover, melting under heat starts earlier, which can improve fusion strength in a mold that has a portion where flows of molten resin join together during molding. The ratio is more preferably 78% or more and 95% or less, still more preferably 80% or more and 94% or less, particularly preferably 81% or more and 92% or less.

In the present invention, the relaxation time $T20_B$ of the $B_{30}$ component after heating at 200° C. for 20 minutes is preferably 0.110 ms or longer and 0.150 ms or shorter. When the relaxation time $T20_B$ is within the above range, the surface of the molded article can have better solvent-swellability when a polyvinyl chloride adhesive is used, thus improving adhesion strength. Moreover, melting under heat starts earlier, which can improve fusion strength in a mold that has a portion where flows of molten resin join together during molding. The lower limit of the relaxation time $T20_B$ is more preferably 0.115 ms, and the upper limit thereof is more preferably 0.145 ms.

The relaxation time $T20_B$ means a relaxation time after heating the chlorinated polyvinyl chloride resin at 200° C. for 20 minutes.

In the present invention, a relaxation time $T_A$ of the $A_{30}$ component is preferably 0.010 ms or longer and shorter than 0.012 ms.

The relaxation time $T_A$ means a relaxation time measured without heating the chlorinated polyvinyl chloride resin.

The chlorinated polyvinyl chloride resin that is an embodiment of the present invention preferably has a percentage of the $A_{30}$ component [$A_{30}$ component/($A_{30}$ component+$B_{30}$ component)] of 90% or more and less than 100%.

The chlorinated polyvinyl chloride resin that is an embodiment of the present invention preferably has a percentage of the $B_{30}$ component [$B_{30}$ component/($A_{30}$ component+$B_{30}$ component)] of 1% or more and 10% or less.

The chlorinated polyvinyl chloride resin that is an embodiment of the present invention preferably contains structural units (a) to (c) represented by the following formulas (a) to (c). Preferably, the proportion of the structural unit (a) is 5.0 mol % or higher, the proportion of the structural unit (b) is 40.0 mol % or lower, and the proportion of the structural unit (c) is 55.0 mol % or lower, relative to the total number of moles of the structural units (a), (b), and (c). This allows the surface of the molded article to have better solvent-swellability when a polyvinyl chloride adhesive is used, thus improving adhesion strength. This also allows melting under heat to start earlier, which can improve fusion strength in a mold that has a portion where flows of molten resin join together during molding.

In the chlorinated polyvinyl chloride resin that is an embodiment of the present invention, the proportion of the structural unit (a) is more preferably 30.0 mol % or higher, still more preferably 35.0 mol % or higher, and preferably 90.0 mol % or lower, more preferably 60.0 mol % or lower, relative to the total number of moles of the structural units (a), (b), and (c).

The proportion of the structural unit (b) is preferably 5.0 mol % or higher, more preferably 15.0 mol % or higher, and more preferably 30.0 mol % or lower, still more preferably 25.0 mol % or lower, relative to the total number of moles of the structural units (a), (b), and (c).

The proportion of the structural unit (c) is preferably 5.0 mol % or higher, more preferably 25.0 mol % or higher, and more preferably 55.0 mol % or lower, still more preferably 40.0 mol % or lower, relative to the total number of moles of the structural units (a), (b), and (c).

[Chem. 1]

  (a)

  (b)

  (c)

The molar ratios of the structural units (a), (b), and (c) in the chlorinated polyvinyl chloride resin that is an embodiment of the present invention reflect the site to which chlorine is introduced at the time of chlorination of the polyvinyl chloride resin (PVC). The PVC prior to chlorination is in a state where it is mostly constituted by the structural unit (a) and the proportions of the structural units (b) and (C) are 0 mol %. As chlorination proceeds, the proportion of the structural unit (a) decreases, while the proportions of the structural units (b) and (c) increase. At this time, nonuniformity of the chlorinated state will increase in a case where the proportion of the structural unit (b), which is unstable, excessively increases, or in a case where the chlorinated site and the unchlorinated site are unevenly present within the same particle of the chlorinated polyvinyl chloride resin. The surface of the molded article can have better solvent-swellability when a polyvinyl chloride adhesive is used, thus improving adhesion strength. Moreover, melting under heat can start earlier, which can improve fusion strength in a mold that has a portion where flows of molten resin join together during molding.

The molar ratios of the structural units (a), (b), and (c) in the chlorinated polyvinyl chloride resin that is an embodiment of the present invention can be measured by molecular structure analysis using NMR. NMR analysis can be performed in accordance with the method described in R. A. Komoroski, R. G. Parker, J. P. Shocker, Macromolecules, 1985, 18, 1257-1265.

The chlorinated polyvinyl chloride resin that is an embodiment of the present invention may contain a different structural unit other than the structural units (a), (b), and (c) as long as the effects of the present invention are not impaired.

The amount of the different structural unit is preferably 0% by mass or more, and preferably less than 10% by mass.

Examples of the different structural unit include a structural unit having a sulfur-containing substituent and the like.

Examples of the sulfur-containing substituent include substituents derived from sulfur compounds and the like.

In the chlorinated polyvinyl chloride resin, a sulfur content (described later) of the chlorinated polyvinyl chloride resin of higher than 0 mass ppm indicates that sulfur is present in the resin and that the sulfur is bound to the resin. This shows that the chlorinated polyvinyl chloride resin contains a structural unit having a sulfur-containing substituent.

Examples of the sulfur-containing substituent include substituents derived from sulfur compounds. Examples of the sulfur compounds include compounds described later. Preferred among these is at least one thioglycolic acid compound selected from the group consisting of thioglycolic acid and a thioglycolic acid ester.

Examples of the structural unit having a sulfur-containing substituent include a structural unit (d) represented by the following formula (d). R in the structural unit (d) is preferably a group to which is bound at least one selected from the group consisting of an alkylene group, an ester group, an alkyl group, and a thiol group, more preferably a group to which is bound at least one selected from the group consisting of an alkylene group, an ester group, and an alkyl group.

[Chem. 2]

(d)

The chlorinated polyvinyl chloride resin that is an embodiment of the present invention preferably has a sulfur content of 5 mass ppm or more and 1,000 mass ppm or less. The sulfur content is more preferably 10 mass ppm or more and 500 mass ppm or less. The sulfur content is still more preferably 200 mass ppm or less.

The sulfur content of the chlorinated polyvinyl chloride resin can be determined by quantitative analysis using ion chromatography (IC). Specifically, the chlorinated polyvinyl chloride resin is dissolved in THF and put in a centrifuge to separate/filter out insoluble components from the solution. An excessive amount of methanol is then added for reprecipitation, and the precipitate is separated by suction filtration and dried in a vacuum drier at 80° C. The resulting sample is weighed in a ceramic boat and then burned in an automatic sample combustion device. The generated gas is captured in 10 mL of an absorber liquid. This absorber liquid is adjusted to 15 mL with ultrapure water, and subjected to IC quantitative analysis. For example, an automatic combustion device (produced by Mitsubishi Chemical Analytech, AQF-2100H) and an IC (produced by Thermo Fisher Scientific, ICS-5000) are used for measurement. Thus, the sulfur content (mass ppm) of the chlorinated polyvinyl chloride resin can be quantified.

In the chlorinated polyvinyl chloride resin that is an embodiment of the present invention, the amount of added chlorine is preferably 1.0% by mass or more and is preferably 16.0% by mass or less.

When the amount of added chlorine is 1.0% by mass or more, a molded article to be obtained has sufficient heat resistance. When the amount of added chlorine is 16.0% by mass or less, moldability is improved.

The amount of added chlorine is more preferably 3.2% by mass or more, still more preferably 6.2% by mass or more. The amount is more preferably 15.2% by mass or less, still more preferably 12.2% by mass or less.

A polyvinyl chloride resin typically has a chlorine content of 56.8% by mass. The amount of added chlorine means the proportion of chlorine introduced into a polyvinyl chloride resin, and can be measured by the method specified in JIS K 7229.

The degree of polymerization of the chlorinated polyvinyl chloride resin that is an embodiment of the present invention is preferably 100 or higher, more preferably 400 or higher, still more preferably 500 or higher. The degree of polymerization is preferably 2,000 or lower, more preferably 1,500 or lower.

When the degree of polymerization is within the above range, fluidity in molding and the strength of the molded article can both be achieved.

The chlorinated polyvinyl chloride resin that is an embodiment of the present invention may be produced by, for example, a method including preparing a suspension in a reaction vessel by suspending a polyvinyl chloride resin in an aqueous medium, introducing chlorine into the reaction vessel, and heating the suspension to chlorinate the polyvinyl chloride resin (chlorination step).

In particular, the chlorinated polyvinyl chloride resin having a ratio [T5$_B$/T$_B$] of the relaxation time T5$_B$ of the B$_{30}$ component after heating at 200° C. for five minutes to the relaxation time T$_B$ of the B$_{30}$ component within a predetermined range can be produced by adjusting the average degree of polymerization and addition concentration of the polyvinyl chloride used, the average chlorine consumption rate, the reaction method (photo-chlorination or thermal chlorination), the reaction temperature, and the reaction pressure in the chlorination step, adding a sulfur compound after the chlorination step, and adjusting the amount of the sulfur compound added.

The reaction vessel used may be a commonly used vessel such as a glass-lined stainless steel reaction vessel or titanium reaction vessel, for example.

The method of preparing the suspension of the polyvinyl chloride resin in an aqueous medium is not limited. For example, a cake-like PVC obtained by subjecting a polymerized PVC to monomer removal treatment may be used, or a dried PVC may be resuspended in an aqueous medium, or a suspension obtained by removing any substance undesired for the chlorination reaction from the polymerization system may be used. It is preferred to use a cake-like resin obtained by subjecting a polymerized PVC to monomer removal treatment.

The aqueous medium used may be ion-exchange-treated pure water, for example. While the amount of the aqueous medium is not limited, generally, it is preferably 150 to 400 parts by mass based on 100 parts by mass of the PVC.

In the chlorination step, the concentration of the polyvinyl chloride resin in the aqueous medium suspension (addition concentration) is preferably 20 to 40% by mass.

Chlorine to be introduced into the reaction vessel may be either liquid chlorine or gaseous chlorine. The use of liquid chlorine is efficient in that a large amount of chlorine can be charged into the reaction vessel in a short period of time. Chlorine may be added in the course of reaction to adjust the pressure or supply chlorine. At this time, gaseous chlorine in addition to liquid chlorine may be blown into the reaction vessel, as required. It is preferred to use chlorine after purging 5 to 10% by mass of chlorine from the cylinder.

While the reaction pressure (gauge pressure in the reaction vessel) in the chlorination step is not limited, it is preferably from 0 to 2 MPa, more preferably from 0.01 to 0.3 MPa because the higher the chlorine pressure is, the more readily the chlorine will penetrate into the PVC particles.

The method of chlorinating the PVC in the suspended state is not limited. Examples of the chlorination method include a method in which light energy such as ultraviolet light is applied to accelerate chlorination by photoreaction (hereinafter referred to as photo-chlorination). The use of light energy such as ultraviolet light requires an apparatus capable of light energy irradiation such as ultraviolet irradiation under high temperature and high pressure conditions.

The reaction temperature in the chlorination step is preferably 30° C. to 130° C. In particular, the reaction temperature in the chlorination step performed by photo-chlorination is preferably 30° C. to 90° C., more preferably 40° C. to 80° C. In the photo-chlorination, the ratio of the light energy irradiation intensity (W) to the total amount (kg) of the raw material PVC and water is preferably 0.001 to 6 (W/kg). The irradiation light preferably has a wavelength of 280 to 420 nm.

The photo-chlorination can provide a chlorinated polyvinyl chloride resin that enables the production of a molded article that has excellent gloss as well as high heat resistance and high mechanical strength.

In the chlorination, preferably, hydrogen peroxide is further added to the suspension. Adding hydrogen peroxide can improve the speed of chlorination. The hydrogen peroxide is added preferably in an amount of 5 to 500 ppm relative to the PVC per hour of reaction time. Adding too little hydrogen peroxide does not provide the effect of improving the speed of chlorination. Adding too much hydrogen peroxide decreases the thermal stability of the CPVC.

When the hydrogen peroxide is added, the heating temperature can be relatively low because the hydrogen peroxide improves the speed of chlorination. The heating temperature may be within the range of 65° C. to 110° C., for example.

In the chlorination step, the average chlorine consumption rate is preferably within the range of 0.01 to 0.025 kg/PVC-Kg·5 min. As used herein, the term "average chlorine consumption rate" refers to the amount of chlorine consumed in 5 minutes per kilogram of the raw material PVC.

When chlorination is performed using the above method, a CPVC having less nonuniformity in the chlorinated state and having excellent thermal stability can be obtained.

In the chlorination method, the concentration of the chlorine introduced into the reaction vessel is preferably 99.5% or higher.

For production of the chlorinated polyvinyl chloride resin, a sulfur compound is preferably added after the chlorination step.

The chlorination step is typically followed by a neutralizing step, a washing step, a dehydrating step, and a drying step in sequence. The step of adding a sulfur compound is preferably performed during or after the dehydrating step. The sulfur compound may be added all at once or in multiple portions. The sulfur compound may be added as is, or may be diluted in a solvent such as water before being added.

Adding a sulfur compound causes addition reaction of the sulfur compound to replace the chlorine that is released from the main chain of the chlorinated polyvinyl chloride resin in the subsequent drying step. As a result, the dehydrochlorination amount during molding is reduced, and thus thermal stability is improved.

The sulfur compound is preferably an organic sulfur compound. Specific examples thereof include thioglycolic acid compounds, thiourea, thioglycerin, thioacetic acid, potassium thioacetate, thiodiacetic acid, thiosemicarbazide, and thioacetamide.

In particular, the sulfur compound is more preferably at least one thioglycolic acid compound selected from the group consisting of thioglycolic acid and a thioglycolic acid ester.

The thioglycolic acid encompasses not only thioglycolic acid but also thioglycolic acid salts such as metal salts, ammonium salts, and amine salts of thioglycolic acid.

Examples of the thioglycolic acid salts include sodium thioglycolate, calcium thioglycolate, ammonium thioglycolate, methylamine thioglycolate, ethylamine thioglycolate, monoethanolamine thioglycolate, diethanolamine thioglycolate, and triethanolamine thioglycolate.

Examples of the thioglycolic acid ester include thioglycolic acid alkyl esters such as methyl thioglycolate, ethyl thioglycolate, n-butyl thioglycolate, t-butyl thioglycolate, 2-ethylhexyl thioglycolate, octyl thioglycolate, isooctyl thioglycolate, decyl thioglycolate, and dodecyl thioglycolate. Also usable is an ester of thioglycolic acid with a hydrocarbon containing an alkoxy group, such as methoxybutyl thioglycolate.

Examples of the thioglycolic acid ester further include an alkanediol dithioglycolate which is a thioglycolic acid ester of an alkanediol, an alkanepolyol polythioglycolate which is a thioglycolic acid ester of an alkanepolyol, and polyalkylene glycol dithioglycolate which is a thioglycolic acid ester of polyalkylene glycol.

Examples of the alkanediol dithioglycolate include ethylene glycol bisthioglycolate, butanediol bisthioglycolate, neopentylglycol bisthioglycolate, and hexanediol bisthioglycolate.

Examples of the alkanepolyol polythioglycolate include trimethylolpropane tris(thioglycolate), pentaerythritol tris(thioglycolate), pentaerythritol tetrakis(thioglycolate), and dipentaerythritol hexa(thioglycolate).

Examples of the polyalkylene glycol dithioglycolate include diethylene glycol dithioglycolate.

The thioglycolic acid compound is preferably a compound represented by $HSCH_2COOR$ (wherein R is H or an alkyl group). The alkyl group has a carbon number of preferably 1 to 8.

In the production method, the lower limit of the amount of the sulfur compound added relative to 100 parts by mass of the chlorinated polyvinyl chloride resin is preferably 0.001 parts by mass, and the upper limit thereof is preferably 10 parts by mass. Adding the sulfur compound in an amount within the above range makes it possible to obtain the chlorinated polyvinyl chloride resin. The upper limit is more preferably 1 part by mass, still more preferably 0.5 parts by mass.

The sulfur compound may be added by any method, and is preferably added at an addition rate of 20 to 500 g/min.

The drying temperature after adding the sulfur compound is preferably 60° C. to 120° C.

The drying time is preferably 6 to 48 hours. The drying temperature and the drying time within the above ranges promote the addition reaction of the sulfur compound. Examples of the drying method include stationary drying, hot-air drying, fan drying, far infrared heat drying, and vacuum drying.

A molded article can be produced by molding a resin composition for molding containing the chlorinated polyvinyl chloride resin.

The present invention also encompasses a resin composition for molding containing the chlorinated polyvinyl chloride resin.

The lower limit of the amount of the chlorinated polyvinyl chloride resin in the resin composition for molding is preferably 65% by mass, more preferably 70% by mass, and the upper limit thereof is preferably 96% by mass, more preferably 93% by mass.

The resin composition for molding that is an embodiment of the present invention may optionally contain additives such as stabilizers, lubricants, processing aids, impact resistance modifiers, heat resistance improvers, antioxidants, ultraviolet absorbents, light stabilizers, fillers, thermoplastic elastomers, pigments, and reinforcement materials.

Examples of the stabilizers include, but are not limited to, thermal stabilizers and thermal stabilization aids. Examples of the thermal stabilizers include, but are not limited to, organotin stabilizers, lead stabilizers, calcium-zinc stabilizers, barium-zinc stabilizers, and barium-cadmium stabilizers.

Examples of the organotin stabilizers include dibutyl tin mercapto, dioctyl tin mercapto, dimethyl tin mercapto, dibutyl tin mercapto, dibutyl tin maleate, dibutyl tin maleate polymers, dioctyl tin maleate, dioctyl tin maleate polymers, dibutyl tin laurate, and dibutyl tin laurate polymers.

Examples of the lead stabilizers include lead stearate, dibasic lead phosphite, and tribasic lead sulfate. These may be used singly or in combination of two or more thereof.

Examples of the thermal stabilization aids include, but are not limited to, epoxidized soybean oil, phosphate, polyol, hydrotalcite, and zeolite. These may be used singly or in combination of two or more thereof.

Examples of the lubricants include internal lubricants and external lubricants.

The internal lubricants are used to reduce the fluid viscosity of the molten resin in molding to prevent the generation of frictional heat. Examples of the internal lubricants include, but are not limited to, butyl stearate, lauryl alcohol, stearyl alcohol, epoxidized soybean oil, glycerol monostearate, stearic acid, and bisamide. These may be used singly or in combinations of two or more.

The external lubricants are used to improve the slip effect between metal surfaces and the molten resin in molding. Examples of the external lubricants include, but are not limited to, paraffin wax, polyolefin waxes, ester waxes, and montanic acid wax. These may be used singly or in combinations of two or more.

Examples of the processing aids include, but are not limited to, acrylic processing aids such as alkyl acrylate-alkyl methacrylate copolymers having a mass average molecular weight of 100,000 to 2,000,000. Examples of the acrylic processing aids include, but are not limited to, n-butyl acrylate-methyl methacrylate copolymers and 2-ethylhexyl acrylate-methyl methacrylate-butyl methacrylate copolymers. These may be used singly or in combination of two or more thereof.

Examples of the impact resistance modifiers include, but are not limited to, methyl methacrylate-butadiene-styrene copolymers (MBS), chlorinated polyethylene, and acrylic rubber.

Examples of the heat resistance improvers include, but are not limited to, α-methylstyrene resins and N-phenylmaleimide resins.

The lower limit of the amount of the impact resistance modifier in the resin composition for molding is preferably 1% by mass, more preferably 2% by mass, and the upper limit thereof is preferably 30% by mass, more preferably 15% by mass.

The impact resistance modifier in an amount in the above range can sufficiently increase the strength of the resulting molded article.

Examples of the antioxidants include, but are not limited to, phenolic antioxidants.

Examples of the light stabilizers include, but are not limited to, hindered amine light stabilizers.

Examples of the ultraviolet absorbents include, but are not limited to, salicylate ultraviolet absorbents, benzophenone ultraviolet absorbents, benzotriazole ultraviolet absorbents, and cyanoacrylate ultraviolet absorbents.

Examples of the fillers include, but are not limited to, calcium carbonate and talc.

Examples of the pigments include, but are not limited to, organic pigments such as azo pigments, phthalocyanine pigments, threne pigments, and dye lake pigments; and inorganic pigments such as oxide pigments, molybdenum chromate pigments, sulfide/selenide pigments, and ferrocyanide pigments.

Examples of the reinforcement materials include, but are not limited to, fiber reinforcement materials and non-fiber reinforcement materials. Examples of fiber reinforcement materials include glass fibers, carbon fibers, aramid fibers, polyethylene terephthalate fibers, cellulose nanofibers (CNF), and kenaf. Examples of non-fiber reinforcement materials include graphite and graphene.

Moreover, a molded article molded from the resin composition for molding that is an embodiment of the present invention is provided. The present invention also encompasses such a molded article.

Here, for the molded article, the chlorinated polyvinyl chloride resin in the molded article can be extracted with an organic solvent or the like to measure the ratio $[T5_B/T_B]$ of the relaxation time $T5_B$ of the $B_{30}$ component after heating at 200° C. for five minutes to the relaxation time $T_B$ of the $B_{30}$ component of the chlorinated polyvinyl chloride resin.

The molded article may contain a reinforcement material such as glass fiber or carbon fiber.

The molding method may be any conventionally known molding method, for example, extrusion molding or injection molding.

The molded article that is an embodiment of the present invention has excellent thermal stability and good appearance. The molded article can therefore be suitably used in applications such as building components, plumbing materials and equipment, and housing materials.

It is known that, if conventional members of transportation machinery or battery systems are faultily manufactured or inappropriately used, the battery cells may ignite. As the capacity of battery cells has been increased to meet the demand for more convenience such as extension of cruise mileage, the risk of ignition is increasing. Nowadays, battery systems for transportation machinery are often mounted at places near crew members, such as vehicle compartments. With conventional safety measures, it is difficult to ensure sufficient evacuation time (about five minutes) for crew members in the event of ignition. Thus, new safety measures are awaited.

Conventional battery pack covers are made from iron. To meet the demand for reducing the weight, replacing iron with aluminum or resin is suggested. However, if battery cells in battery systems ignite, aluminum or resin covers cannot prevent flame and smoke from occurring. Measures to take for this issue are also necessary.

With regard to battery packs having a lower face reinforced with metal, the inner temperature of such battery packs rises when the transportation machinery makes contact with flame from a road, possibly causing thermal runaway of the cells and ignition. It is therefore necessary to prevent fire from penetrating into the battery packs and prevent an increase in the temperature inside the battery packs. Fuel cell vehicles are equipped with a hydrogen tank which has a risk of explosion, and thus measures to deal with external flames are also necessary. Moreover, with miniaturization and the reduction of weight of hydrogen tanks for space expansion of vehicle compartments or free layout design, if the number of equipped hydrogen tanks is increased, the parts possibly to contact fire may not be identified. Thus, covers to enclose the entirety of a battery pack or a hydrogen tank also need measures against heat or ignition.

The present invention can provide a molded article having high heat resistance, high flame retardancy, excellent impact resistance, excellent chemical resistance, and excellent transparency. The molded article can suitably be used as a member of transportation machinery or battery systems.

Examples of the transportation machinery include automobiles such as gasoline-powered vehicles, hybrid vehicles, electric vehicles, and fuel cell vehicles; motorcycles such as gasoline-powered motorcycles, hybrid motorcycles, and electric motorcycles; bicycles such as power assisted bicycles; railway vehicles; vessels; and aircraft.

Examples of the member of transportation machinery include mechanism members, interior members, exterior members, glass, and light covers.

Examples of the mechanism members include cooling pipes, air bag covers, air ducts, and heater units.

Examples of the interior members include ceiling, instrument panels, console boxes, arm rests, seat belt buckles, switches, and door trims.

Examples of the exterior members include emblems, number plate housings, bumper cores, and under covers.

Examples of the battery systems include primary batteries such as nickel manganese batteries, lithium batteries, and zinc-air batteries; secondary batteries such as nickel hydrogen batteries, lithium-ion batteries, and lead storage batteries; solar cells such as silicon solar cells, dye-sensitized solar cells, and perovskite solar cells; and fuel cells such as solid polymer fuel cells, alkali fuel cells, phosphoric acid fuel cells, and solid oxide fuel cells.

Examples of the member of battery systems include battery cases, battery cooling water jackets, hydrogen tank covers, connectors, and insulation sheets.

Advantageous Effects of Invention

The present invention can provide a chlorinated polyvinyl chloride resin that enables the production of a molded article that maintains high adhesion strength even when used in a form subjected to high pressure and is less susceptible to defects such as cracks due to insufficient strength, as well as a resin composition for molding and a molded article each including the chlorinated polyvinyl chloride resin. The present invention also makes it possible to achieve high bondability in a short time.

DESCRIPTION OF EMBODIMENTS

The present invention is hereinafter described in more detail with reference to examples; however, the present invention should not be limited to these examples.

Example 1

A glass-lined reaction vessel having an inner capacity of 300 L was charged with 130 kg of ion-exchanged water and 50 kg of a polyvinyl chloride resin having an average degree of polymerization of 1,000. They were stirred to disperse the polyvinyl chloride resin in water to prepare an aqueous suspension, and then the inside of the reaction vessel was heated to raise the temperature of the aqueous suspension to 70° C. Subsequently, the inside of the reaction vessel was depressurized to remove oxygen (oxygen content 100 ppm). Thereafter, with stirring, chlorine (oxygen content 50 ppm) was introduced at a partial pressure of chlorine of 0.04 MPa, and the suspension was irradiated with ultraviolet light having a wavelength of 365 nm at an irradiation intensity of 160 W using a high-pressure mercury lamp, thereby starting chlorination reaction.

Then, the chlorination temperature was kept at 70° C., the partial pressure of chlorine was kept at 0.04 MPa, and the average chlorine consumption rate was adjusted to 0.02 kg/PVC-kg-5 min. When the amount of added chlorine reached 9.5% by mass, the ultraviolet irradiation using the high-pressure mercury lamp and the chlorine gas supply were terminated, whereby chlorination was terminated.

Subsequently, unreacted chlorine was removed by nitrogen gas aeration, and the obtained chlorinated polyvinyl chloride resin slurry was neutralized with sodium hydroxide, washed with water, and dehydrated in a centrifuge (produced by Tanabe Tekkosho K.K., O-15 model) for three minutes.

After dehydration, 0.1 parts by mass (0.05 kg) of 2-ethylhexyl thioglycolate (produced by FUJIFILM Wako Pure Chemical Corporation) was added to 100 parts by mass (50 kg) of the chlorinated polyvinyl chloride resin at 200 g/min. This was followed by stationary drying at 90° C. Thus, a powdery, photo-chlorinated polyvinyl chloride resin (amount of added chlorine: 9.5% by mass) was obtained.

Comparative Example 1

A glass-lined reaction vessel having an inner capacity of 300 L was charged with 130 kg of ion-exchanged water and 50 kg of a polyvinyl chloride resin having an average degree of polymerization of 1,000. They were stirred to disperse the polyvinyl chloride resin in water to prepare an aqueous suspension, and then the inside of the reaction vessel was heated to raise the temperature of the aqueous suspension to 140° C. Subsequently, the inside of the reaction vessel was depressurized to remove oxygen (oxygen content 100 ppm). Thereafter, with stirring, chlorine (oxygen content 50 ppm) was introduced at a partial pressure of chlorine of 0.04 MPa, thereby starting thermal chlorination.

Then, the chlorination temperature was kept at 140° C. and the partial pressure of chlorine was kept at 0.4 MPa. After the amount of added chlorine reached 4.4% by mass, addition of a 200 ppm hydrogen peroxide solution was started at 15 ppm/Hr in terms of hydrogen peroxide relative to the polyvinyl chloride resin, and the average chlorine consumption rate was adjusted to 0.05 kg/PVC-kg-5 min. When the amount of added chlorine reached 9.5% by mass, the supply of hydrogen peroxide solution and chlorine gas was terminated, whereby chlorination was terminated.

Subsequently, unreacted chlorine was removed by nitrogen gas aeration, and the obtained chlorinated polyvinyl chloride resin slurry was neutralized with sodium hydroxide, washed with water, and dehydrated in a centrifuge (produced by Tanabe Tekkosho K.K., 0-15 model) for three minutes. This was followed by stationary drying at 90° C. Thus, a powdery, thermally chlorinated polyvinyl chloride resin (amount of added chlorine: 9.5% by mass) was obtained.

Examples 2 to 8 and Comparative Examples 2 and 3

A powdery chlorinated polyvinyl chloride resin was obtained as in Example 1 except that the average degree of polymerization and the charged amount of the polyvinyl chloride resin, the amount of the sulfur compound added, the reaction temperature, the average chlorine consumption rate, the drying temperature, and the drying time were changed as shown in Table 1.

(Evaluation)

The chlorinated polyvinyl chloride resins obtained in the examples and the comparative examples were evaluated as follows. Table 1 shows the results.

(1) Pulse NMR Measurement

The obtained powdery chlorinated polyvinyl chloride resin was placed in a glass sample tube having a diameter of 10 mm (produced by BRUKER, Product No. 1824511, 10 mm in diameter, 180 mm in length, flat bottom) so as to fall within the measurement range of a pulse NMR apparatus. The sample tube was set in the pulse NMR apparatus (produced by BRUKER, "the minispec mq20") and subjected to measurement by the solid echo method at 30° C. under the conditions below, thereby obtaining a free induction decay curve of 1H spin-spin relaxation.

<Solid Echo Method>
Scans: 128 times
Recycle delay: 1 sec
Acquisition scale: 0.5 ms The free induction decay curve was subjected to waveform separation into two curves derived from the $A_{30}$ component and the $B_{30}$ component. The waveform separation was performed by fitting using a Gaussian model. The percentages of the two components were determined from the curves derived from the components obtained in the measurement.

Using analysis software "TD-NMRA (Version 4.3, Rev. 0.8)" produced by BRUKER, a Gaussian-model fitting was applied to the $A_{30}$ component and $B_{30}$ component in conformity with the product manual.

The following equation was used in the fitting.

$$Y = A \times \exp\left(-\frac{1}{2} \times \left(\frac{t}{T_A}\right)^2\right) + B \times \exp\left(-\frac{1}{2} \times \left(\frac{t}{T_B}\right)^2\right) + C \times \exp\left(-\frac{1}{T_C}\right) \quad [\text{Math. 1}]$$

In the formula, A represents the percentage of the $A_{30}$ component, B represents the percentage of the $B_{30}$ component, $T_A$ represents the relaxation time of the $A_{30}$ component, $T_B$ represents the relaxation time of the $B_{30}$ component, and t represents time.

The $A_{30}$ component and the $B_{30}$ component are components defined in order of shorter relaxation time in pulse NMR measurement.

(Measurement after Heating at 200° C. for Five Minutes)

The obtained powdery chlorinated polyvinyl chloride resin in an amount of 300 g was placed in an aluminum tray, uniformly levelled, and then heated in an oven (produced by Toyo Seiki Seisaku-Sho, Ltd., CO—O2) at 200° C. for five minutes. Thereafter, the percentages of the two components ($A_{30}$ component and $B_{30}$ component), the relaxation time $T5_A$ of the $A_{30}$ component, and the relaxation time $T5_B$ of the $B_{30}$ component were determined by the same method as above.

(Measurement after Heating at 200° C. for 20 Minutes)

The obtained powdery chlorinated polyvinyl chloride resin in an amount of 300 g was placed in an aluminum tray, uniformly levelled, and then heated in an oven (produced by Toyo Seiki Seisaku-Sho, Ltd., CO—O2) at 200° C. for 20 minutes. Thereafter, the percentages of the two components ($A_{30}$ component and $B_{30}$ component), the relaxation time $T20_A$ of the $A_{30}$ component, and the relaxation time $T20_B$ of the $B_{30}$ component were determined by the same method as above.

The $T5_B/T_B$ and the $T5_B/T20_B$ were calculated from the obtained $T_B$, $T5_B$, and $T20_B$.

(2) Measurement of Amount of Added Chlorine

The amount of added chlorine was measured for each of the obtained chlorinated polyvinyl chloride resins in conformity with JIS K 7229.

(3) Molecular Structure Analysis

The molecular structure of each of the obtained chlorinated polyvinyl chloride resins was analyzed in conformity with the NMR measurement method described in R. A. Komoroski, R. G. Parker, J. P. Shocker, Macromolecules, 1985, 18, 1257-1265 so as to determine the amount of the structural units (a) and (b) relative to the total number of moles of the structural units (a), (b), and (c).

The NMR measurement conditions were as follows.
Apparatus: FT-NMRJEOLJNM-AL-300
Measured nuclei: 13C (proton complete decoupling)
Pulse width: 90°
PD: 2.4 sec
Solvent: o-dichlorobenzene: deuterated benzene (C5D5) =3:1
Sample concentration: about 20%
Temperature: 110° C.
Reference material: central signal for benzene set to 128 ppm
Number of scans: 20,000

(4) Measurement of Sulfur Content of Chlorinated Polyvinyl Chloride Resin

An amount of 300 parts by mass of THF was added to 10 parts by mass of each of the obtained chlorinated polyvinyl chloride resins, stirred for 24 hours for dissolution, followed by further stirring in a centrifuge (produced by Kokusan Co., Ltd., H-200NR) at 14,000 rpm for 1 hour to precipitate insoluble components. The insoluble components were filtered out, and to the filtrate was added 1,000 parts by mass of methanol to reprecipitate the resin. While the resin was washed with methanol, suction filtration was performed using an aspirator (produced by AS ONE Corporation, GAS-1N) to separate the resin from the filtrate. In this manner, a sulfur-bound resin was obtained. The resin was put in a vacuum drier (produced by Tokyo Rikakikai Co., Ltd., VOS-451SD) and dried at 80° C. for 24 hours. Combustion IC was performed to detect CS bonds. The obtained sample was weighed in a ceramic boat, and then burned in an automatic sample combustion device. The generated gas was captured in 10 mL of an absorber liquid. This absorber liquid was adjusted to 15 mL with ultrapure water, and subjected to IC quantitative analysis. After a linear approximation of a $SO_4^{2-}$ anion calibration curve by measurement of a reference substance, the sample was measured to quantify the sulfur content (mass ppm) of the chlorinated polyvinyl chloride resin.

The measurement conditions for the automatic combustion device are as follows.
   Device: AQF-2100H, produced by Mitsubishi Chemical Analytech
   Inlet temperature: 1,000° C.
   Outlet temperature: 1,100° C.
   Gas flow rate $O_2$: 400 mL/min
   Gas flow rate Ar: 200 mL/min
   Ar water supply unit: 100 mL/min
   The conditions for IC are as follows.
   Device: ICS-5000, produced by Thermo Fisher Scientific
   Separation column: Dionex IonPac AS18-4 µm (2 mm×150 mm)
   Guard column: Dionex IonPac AG18-4 µm (2 mm×30 mm)
   Suppressor system: Dionex AERS-500 (external mode)
   Detector: conductivity detector
   Eluent: aqueous KOH solution (eluent generator EGC500)
   Eluent flow rate: 0.25 mL/min
   Sample injection volume: 100 µL (5) Adhesion Evaluation
(Preparation of Pipe)

An amount of 4.0 parts by mass of an impact resistance modifier was added to 100 parts by mass of each of the obtained chlorinated polyvinyl chloride resins. Then, 0.5 parts by mass of a thermal stabilizer was added and mixed. The impact resistance modifier used was Kane Ace B-564 (produced by Kaneka Corporation, methyl methacrylate-butadiene-styrene copolymer). The thermal stabilizer used was TVS #1380 (produced by Nitto Kasei Co., Ltd., organotin stabilizer).

Further, 1.5 parts by mass of a polyethylene lubricant (produced by Mitsui Chemicals, Inc., Hiwax 220MP) and 0.2 parts by mass of a fatty acid ester lubricant (produced by Emery Oleochemicals Japan Ltd., LOXIOL G-32) were added. They were then uniformly mixed in a super mixer to prepare a chlorinated polyvinyl chloride resin composition.

The obtained chlorinated polyvinyl chloride resin composition was supplied to a conical counter-rotating twin screw extruder (produced by Osada Seisakusho, SLM-50) having a diameter of 50 mm and formed into pipes at a resin temperature of 200° C., each pipe having an outer diameter of 26.7 mm and a wall thickness of 2.4 mm.

(Preparation of Joint)

An amount of 5.0 parts by mass of an impact resistance modifier was added to 100 parts by mass of a chlorinated polyvinyl chloride resin (produced by Sekisui Chemical Co., Ltd., HA-24KL). Further, 3.0 parts by mass of a thermal stabilizer was added and mixed. The impact resistance modifier used was Kane Ace M-511 (produced by Kaneka Corporation, methyl methacrylate-butadiene-styrene copolymer). The thermal stabilizer used was TVS #1380 (produced by Nitto Kasei Co., Ltd., organotin stabilizer).

Further, 2.0 parts by mass of a polyethylene lubricant (produced by Mitsui Chemicals, Inc., Hiwax 220MP) and 0.3 parts by mass of a fatty acid ester lubricant (produced by Emery Oleochemicals Japan Ltd., LOXIOL G-32) were added. They were then uniformly mixed in a super mixer to prepare a chlorinated polyvinyl chloride resin composition.

The obtained chlorinated polyvinyl chloride resin composition was supplied to a conical counter-rotating twin screw extruder (produced by Osada Seisakusho, OSC-30) having a diameter of 30 mm and formed into pellets at a resin temperature of 190° C. The obtained pellets were supplied to an injection molding machine (produced by JSW, J350ADS) and formed into a socket having an outer diameter of 34.7 mm and an inner diameter of 26.9 mm.

(Preparation of Assembled Sample)

Two of the obtained pipes were cut to a length of 20 cm and bonded to the two ends of the obtained joint using an adhesive (produced by IPS, WELD-ON 724). The workpiece was then left to stand at 23° C. for 14 days, and left to stand in an oven (produced by Toyo Seiki Seisaku-Sho, Ltd., CO—O2) at 82° C. for 2 days, whereby an assembled sample was obtained.

(Adhesion Evaluation)

The inside of the obtained assembled sample was filled with water. The test was started by pressurizing the pipes to a hoop stress of 15.93 MPa using a hydrostatic pressure resistance tester (produced by IPT, 1662-0021) in an atmosphere adjusted to 65° C. with an oven. The time until a disconnection occurred between the pipe and joint to which the adhesive was applied was measured.

The adhesion was evaluated as "o" (Good) when no disconnection was observed after 1,000 hours from the start of the test, and evaluated as "x" (Poor) when a disconnection occurred by 1,000 hours.

(6) Evaluation of Short-Term Bondability (Preparation of pipe) and (Preparation of joint) were performed in the same manner as in "(5) Adhesion evaluation". (Preparation of assembled sample) and (Evaluation of short-term bondability) were then performed as follows.

(Preparation of Assembled Sample)

Two of the obtained pipes were cut to a length of 20 cm and bonded to the two ends of the obtained joint using an adhesive (produced by IPS, WELD-ON 724). The workpiece was then left to stand at 23° C. for 24 hours, and left to stand in an oven (produced by Toyo Seiki Seisaku-Sho, Ltd., CO—O2) at 82° C. for two days, whereby an assembled sample was obtained.

(Evaluation of Short-Term Bondability)

The inside of the obtained assembled sample was filled with water. The test was started by pressurizing the pipes to an actual pressure of 3.6 MPa using a hot internal pressure creep tester (produced by YONEKURA MFG. Co., Ltd.) in an atmosphere adjusted to 82° C. with an oven. The time until a disconnection occurred between the pipe and joint to which the adhesive was applied was measured, and the short-term bondability was evaluated in accordance with the following criteria.

o (Good): No disconnection was observed after six minutes after the start of the test.
  x (Poor): A disconnection occurred by six minutes after the start of the test.

(7) Molded Article Strength Evaluation

The presence or absence of cracks or fractures in the pipes and joint were determined after "(5) Adhesion evaluation", and the molded article strength was evaluated in accordance with the following criteria.

o (Good): No crack or fracture was observed after 1,000 hours.
  x (Poor): Cracks or fractures were observed by 1,000 hours.

TABLE 1

| | | | | Example | | | | | | | | Comparative Example | | |
|---|---|---|---|---|---|---|---|---|---|---|---|---|---|---|
| | | | | 1 | 2 | 3 | 4 | 5 | 6 | 7 | 8 | 1 | 2 | 3 |
| Production method | Raw material PVC | Average degree of polymerization | | 1000 | 1000 | 1000 | 700 | 1000 | 1000 | 1000 | 1000 | 1000 | 1000 | 1000 |
| | | Charged amount | kg | 50 | 50 | 50 | 50 | 50 | 50 | 50 | 50 | 50 | 25 | 50 |
| | Water | Ion-exchanged water | | | | | | | | | | | | |
| | Chlorination conditions | Reaction temperature | °C | 130 | 130 | 130 | 130 | 130 | 130 | 130 | 130 | 130 | 130 | 130 |
| | | Reaction pressure | Mpa | 70 | 60 | 80 | 70 | 70 | 70 | 70 | 70 | 140 | 70 | 70 |
| | | PVC + water | kg | 0.04 | 0.04 | 0.04 | 0.04 | 0.04 | 0.04 | 0.04 | 0.04 | 0.40 | 0.04 | 0.04 |
| | | Resin concentration (PVC/(PVC + water))*100 | mass % | 180 | 180 | 180 | 180 | 180 | 180 | 180 | 180 | 180 | 155 | 180 |
| | | | | 28 | 28 | 28 | 28 | 28 | 28 | 28 | 28 | 28 | 16 | 28 |
| | | Average chlorine consumption rate | kg/pvc-kg · 5 min | 0.02 | 0.015 | 0.02 | 0.02 | 0.02 | 0.02 | 0.02 | 0.02 | 0.05 | 0.04 | 0.02 |
| | | UV wavelength | nm | 365 | 365 | 365 | 365 | 365 | 365 | 365 | 365 | — | 365 | 365 |
| | | 200 ppm hydrogen peroxide | ppm/hr | — | — | — | — | — | — | — | — | 15 | 0 | — |
| | | Amount of 2-ethylhexyl thio-glycolate added | parts by mass | 0.1 | 0.1 | 0.1 | 0.1 | 0.1 | 0.05 | 5.0 | 0.1 | 0 | 0 | 0.1 |
| | | Drying temperature | °C | 90 | 90 | 90 | 90 | 90 | 90 | 90 | 120 | 90 | 90 | 50 |
| | | Drying time | hr | 12 | 12 | 12 | 12 | 7.3 | 12 | 12 | 6 | 12 | 12 | 72 |
| Chlorinated polyvinyl chloride resin | | Amount of added chlorine | mass % | 9.5 | 9.5 | 9.5 | 9.5 | 12 | 9.5 | 9.5 | 9.5 | 9.5 | 9.5 | 9.5 |
| | | Sulfur content of resin | mass ppm | 13 | 13 | 12 | 12 | 12 | 11 | 18 | 13 | 0 | 0 | 3 |
| | Structure | Structural unit (a) —CH$_2$—CHCl— | mol % | 43.4 | 42.1 | 40.1 | 40.9 | 48.5 | 43.4 | 43.4 | 43.4 | 42.0 | 31.3 | 43.4 |
| | | Structural unit (b) —CH$_2$—CCl$_2$— | mol % | 24.2 | 22.7 | 36.4 | 19.1 | 22.1 | 24.2 | 24.2 | 24.2 | 20.2 | 39.3 | 24.2 |
| | Pulse NMR [30° C. measurement] | Not heated | $T_A$ ms | 0.0114 | 0.0114 | 0.0114 | 0.0114 | 0.0114 | 0.0112 | 0.0114 | 0.0114 | 0.0116 | 0.0114 | 0.0114 |
| | | | $T_B$ ms | 0.1531 | 0.1538 | 0.1544 | 0.1485 | 0.1809 | 0.1975 | 0.1187 | 0.1510 | 0.1578 | 0.1565 | 0.1780 |
| | | | $A_{30}$ % | 97.9 | 97.9 | 97.8 | 98.5 | 98.4 | 98.8 | 97.4 | 97.8 | 98.7 | 98.1 | 97.7 |
| | | | $B_{30}$ % | 2.1 | 2.1 | 2.2 | 1.5 | 1.6 | 1.2 | 2.6 | 2.2 | 1.3 | 1.9 | 2.3 |
| | | After heating at 200° C. for 5 minutes | $T5_A$ ms | 0.0114 | 0.0114 | 0.0114 | 0.0114 | 0.0114 | 0.0112 | 0.0114 | 0.0114 | 0.0115 | 0.0113 | 0.0114 |
| | | | $T5_B$ ms | 0.1265 | 0.1398 | 0.1221 | 0.1316 | 0.1518 | 0.1774 | 0.0964 | 0.1206 | 0.1599 | 0.1092 | 0.1718 |
| | | | $A_{30}$ % | 97.7 | 97.7 | 97.7 | 98.5 | 98.4 | 98.8 | 97.4 | 97.8 | 98.9 | 97.8 | 980 |
| | | | $B_{30}$ % | 2.3 | 2.3 | 2.3 | 1.5 | 1.6 | 1.2 | 2.6 | 2.2 | 1.1 | 2.2 | 2.0 |
| | | After heating at 200° C. for 20 minutes | $T20_A$ ms | 0.0114 | 0.0114 | 0.0114 | 0.0114 | 0.0114 | 0.0112 | 0.0114 | 0.0114 | 0.0116 | 0.0114 | 0.1114 |
| | | | $T20_B$ ms | 0.1377 | 0.1461 | 0.1423 | 0.1583 | 0.1628 | 0.1893 | 0.1104 | 0.1307 | 0.1599 | 0.1549 | 0.1802 |
| | | | $A_{30}$ % | 97.9 | 97.9 | 97.9 | 98.6 | 98.2 | 98.9 | 97.3 | 97.9 | 99.1 | 98.1 | 98.1 |
| | | | $B_{30}$ % | 2.1 | 2.1 | 2.1 | 1.4 | 1.8 | 1.1 | 2.7 | 2.1 | 0.9 | 2.0 | 1.9 |
| | | Relaxation time ratio $T5_B/T_B$ | % | 82.6 | 90.9 | 79.1 | 88.6 | 83.9 | 89.8 | 81.2 | 79.9 | 101.3 | 69.8 | 96.5 |
| | | Relaxation time ratio $T5_B/T20_B$ | % | 91.9 | 95.7 | 85.8 | 83.1 | 93.2 | 93.7 | 87.3 | 92.3 | 100.0 | 70.5 | 95.3 |
| Evaluation | | Adhesion | Occurrence of disconnection | ○ | ○ | ○ | ○ | ○ | ○ | ○ | ○ | × | ○ | ○ |
| | | | Disconnection time | 6 | 6 | 6 | 6 | 6 | 6 | 6 | 6 | 4 | 5 | 6 |
| | | | Rating min | 1000 | 1000 | 1000 | 1000 | 1000 | 1000 | 1000 | 1000 | 40 | 980 | 800 |
| | | Short-term bondability | Rating | ○ | ○ | ○ | ○ | ○ | ○ | ○ | ○ | × | ○ | × |
| | | Molded article strength | Rating | ○ | ○ | ○ | ○ | ○ | ○ | ○ | ○ | ○ | × | ○ |

INDUSTRIAL APPLICABILITY

The present invention can provide a chlorinated polyvinyl chloride resin that enables the production of a molded article that maintains high adhesion strength even when used in a form subjected to high pressure and is less susceptible to defects such as cracks due to insufficient strength, as well as a resin composition for molding and a molded article each including the chlorinated polyvinyl chloride resin.

The invention claimed is:

1. A chlorinated polyvinyl chloride resin comprising two components including a $A_{30}$ component and a $B_{30}$ component, the $A_{30}$ component and the $B_{30}$ component being determined by measuring the resin by a solid echo method using pulse NMR at 30° C. to give a free induction decay curve of $^1$H spin-spin relaxation, and subjecting the free induction decay curve to waveform separation into two curves derived from the $A_{30}$ component and the $B_{30}$ component in order of shorter relaxation time using the least square method, and having a ratio of $T5_B$ to $T_B$ [$T5_B/T_B$] of 76% or more and less than 96%, where $T_B$ is a relaxation time of the $B_{30}$ component and $T5_B$ is a relaxation time of the $B_{30}$ component after heating at 200° C. for five minutes.

2. The chlorinated polyvinyl chloride resin according to claim 1, having a ratio of $T5_B$ to $T20_B$ [$T5_B/T20_B$] of 76% or more and less than 96%, where $T5_B$ is the relaxation time of the $B_{30}$ component after heating at 200° C. for 5 minutes and $T20_B$ is a relaxation time of the $B_{30}$ component after heating at 200° C. for 20 minutes.

3. A resin composition for molding, comprising the chlorinated polyvinyl chloride resin according to claim 1.

4. A molded article molded from the resin composition for molding according to claim 3.

* * * * *